United States Patent [19]

Hellerstein

[11] Patent Number: 5,717,835
[45] Date of Patent: Feb. 10, 1998

[54] SIMPLE APPROACH TO CASE-BASED REASONING FOR DATA NAVIGATION TASKS

[75] Inventor: Joseph Hellerstein, Ossining, N.Y.

[73] Assignee: International Business Machines Corporation, Armonk, N.Y.

[21] Appl. No.: 371,182

[22] Filed: Jan. 11, 1995

[51] Int. Cl.$^6$ .................................................. G06F 17/00
[52] U.S. Cl. .................................. 395/51; 395/60; 395/62
[58] Field of Search ............................. 395/51, 60, 62, 395/50, 54, 75, 77

[56] References Cited

U.S. PATENT DOCUMENTS

| | | |
|---|---|---|
| 4,891,766 | 1/1990 | Derr et al. . |
| 4,924,408 | 5/1990 | Highland . |
| 4,949,278 | 8/1990 | Davies et al. . |
| 5,010,478 | 4/1991 | Deran .................... 364/200 |
| 5,224,206 | 6/1993 | Simoudis ................... 395/77 |

FOREIGN PATENT DOCUMENTS

| | | | |
|---|---|---|---|
| 0442809 | 8/1991 | European Pat. Off. | G06F 11/22 |
| 9215951 | 9/1992 | WIPO | G06F 15/00 |

OTHER PUBLICATIONS

Soga, Case Oriented Planning Support System for Business Information Systems; 1994 Int'l Conf. Systems, Man, and Cybernetics, IEEE Apr. 1994.

Sowa, Conceptual Graphs as a Universal Knowledge Representation; Computers Math. App. V23 n 2-5 pp. 75-93 1992.

Primary Examiner—Robert W. Downs
Assistant Examiner—Jeffrey S. Smith
Attorney, Agent, or Firm—Kevin M. Jordan

[57] ABSTRACT

An architecture and key algorithms are presented that simplify the implementation and improve the functionality of knowledge-based systems that employ case-based reasoning for data navigation tasks (e.g., solving help desk problems using a database of past problem instances). The various embodiments of the invention improve on the state-of-the-art in several respects: (a) provides greatly increased flexibility in choosing attributes relevant to a case in that choices are made dynamically at case acquisition instead of statically when the knowledge-based system is designed; (b) increased system flexibility and decreased system complexity by not requiring designers to specify the manner in which attribute values are compared; (c) simplified system design by avoiding the use of similarity metrics; (d) allows for the incremental acquisition of data in problem instances, instead of requiring that all potentially relevant data be collected; and (e) provides a way to explain why a problem solution was chosen. Case acquisition is accomplished by having end-users replay the steps taken to solve a problem instance. Each such step constitutes a navigation element that consists of: (i) a test expressing the conditions under which the navigation is done; (ii) a text description explaining the step; and (iii) a database query expressing the next navigation. Algorithms are presented for case acquisition, case retrieval, and case removal. The case repository is structured as a graph of navigation elements that, under appropriate circumstances, combines into a single node those navigation elements common to multiple cases.

32 Claims, 9 Drawing Sheets

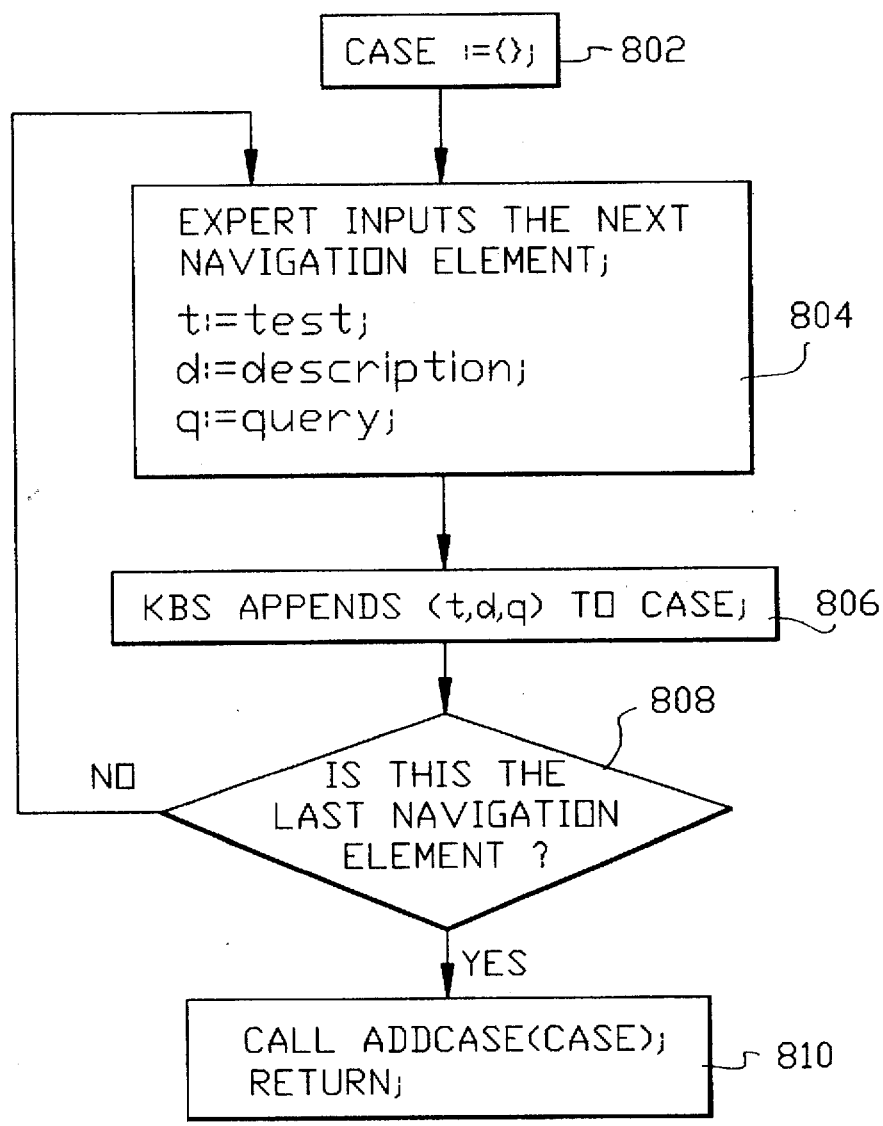

SIMPLE APPROACH TO CASE-BASED REASONING FOR DATA NAVIGATION TASKS

BACKGROUND OF THE INVENTION

1. Field of the Invention

The present invention relates generally to the field of knowledge-based systems; that is, systems that explicitly represent human knowledge so as to improve their effectiveness. More specifically, the invention relates to case-based reasoning, an approach to knowledge-based systems that matches new problem instances with past problem-solution pairs (or cases) that are in a case repository.

2. Related Art

Traditionally, knowledge-based systems have been developed using rules, which are if-then statements that express actions to take (the then part) when specific conditions arise (the if part). Unfortunately, developing rules has been hampered by the knowledge engineering bottleneck—the need for highly skilled personnel (referred to as knowledge engineers) who understand both the problem domain and rule-based programming.

Case-based reasoning avoids the knowledge engineering bottleneck. Instead of requiring knowledge engineers to formulate rules, case-based reasoning relies on end-users to accumulate problem-solution pairs (or cases) in a case repository that is consulted when a new problem instance is to be solved. Given a new problem instance, a case-based system searches the case repository for a previously solved problem that is very similar to the new problem instance. If an exact match is found, its associated solution is reported. If not, close matches are reported. More advanced systems attempt to adapt close matches to the problem instance.

Herein, the emphasis is on case acquisition and retrieval. In the current-state-of-the-art (e.g., Janet Kolodner, Case-Based Reasoning, Morgan Kaufman, 1993 and Lundy Lewis, Case-based Reasoning Approach to the Management of Faults in Communications Networks, IEEE INFOCOM, V. 3, 1993), developing systems for case acquisition and retrieval requires specifying:

1. the attributes of problem instances (sometimes referred to as the indexing vocabulary) to be used when searching for similar cases;
2. algorithms for comparing attributes so as to quantify the degree of similarity between two attribute values (e.g., for numeric values, an algorithm might use: absolute differences, squared differences, and percentage change); and
3. an algorithm for computing the similarity metrics that are used to determine which cases are retrieved (e.g., a weighted sum of the results produced in (2) for each attribute value).

(The combination of the latter two are sometimes referred to as the matching or similarity problem.)

For example, in a help desk application for solving performance problems, relevant information about a problem instance may include: date, time, response times, time spent waiting for input/output, and input/output operations by user for each disk. Each of these is an attribute whose value may be stored in a field of a database record. Having specified this, the system then operates in two modes:

I. Case acquisition mode: New problem-solution pairs are stored in the case repository. Cases are indexed based on the values of the attributes selected.

II. Case retrieval mode: When a new problem instance is presented to the system, values of its attributes are used to compute separate similarity metrics for each case in the case repository. Cases with the largest similarity metrics are retrieved.

While the case-based approach avoids the knowledge engineering bottleneck, it creates a new problem, which we refer to as the data engineering bottleneck. That is, designers of these systems must consider the following:

1. which attributes to use;
2. the choice of attribute comparison algorithm; and
3. the choice of algorithm for computing similarity metrics.

It may seem that the first concern can be circumvented by using all attributes. However, this approach is not always possible since the set of attributes may change dynamically. Further, there may be a high cost for computing the similarity metric if there are a large number of attributes.

Other approaches are in use that, like case-based reasoning, attempt to avoid the knowledge engineering bottleneck of rule-based systems. Broadly, these are data-intensive learning algorithms. Included here are: statistical classification (e.g., Richard Johnson and Dean Wichern, Applied Multivariate Statistical Analysis, Prentice Hall, 1988); neural networks (e.g., Sholom Weiss and Casimir Kulikowski, Computer Systems That Learn, Morgan Kaufmann, 1990); decision trees (e.g., Sholom Weiss and Casimir Kulikowski, ibid.); and learning apprentice systems (e.g., Lisa Dent et al., A Personal Learning Apprentice, Proceedings of the Joint Conference on Artificial Intelligence, 1992). Unlike case-based reasoning, these techniques employ 'learning' algorithms to make the association between new problem instances and solutions encountered previously.

While learning algorithms have appeal, they have drawbacks as well. Like case-based systems, these approaches require data engineering. Further, a potentially large number of similar problem-solution pairs are needed for the learning algorithms to operate. Additionally, learning algorithms (especially neural networks) often require careful adjustment of their parameters if good performance is to be achieved.

A further drawback of current case-based and data-intensive approaches is that potentially relevant data must be obtained even though not all problem instances require these data. For example, consider a help desk application for performance problems. It may be that the solution to some problems requires having disk utilization reported by user. Such measurements are not usually collected because of the CPU processing and disk storage overheads of doing so. By requiring such data to be collected for all problem instances, the cost of operating the knowledge-based system can be greatly increased.

A final difficulty with current case-based and data-intensive approaches is automatically generating meaningful explanations of how solutions are obtained. The issue here is that in the current state-of-the-art, the association between problems and solutions is made by complex algorithms, such as algorithms for matching (in case-based systems), learning (e.g., in neural networks), and decision rule construction (in decision rule systems). We note that decision rules can provide explanations in terms of the rules constructed. But decision rule systems cannot explain how the rules themselves were obtained from the training data. The latter is important, for example, to determine how the choice of solution is affected by inaccurate data.

SUMMARY OF THE INVENTION

In light of the above, the present invention includes a novel architecture and key algorithms for a class of case-based systems that avoid the data engineering bottleneck for data navigation tasks. In particular, various embodiments of the invention: (a) defers until the time at which a case is acquired the determination of which attributes are relevant to a case; (b) provides flexibility as to the manner in which attribute values are compared (e.g., by allowing the same attribute to be compared in different ways for different cases); (c) avoids the use of similarity metrics (and hence does not require algorithms for their computation); (d) allows attribute values to be acquired incrementally as they are needed, rather than en mass when the problem is first presented to the system or when the system is calibrated with training data; and (e) provides for the automatic generation of explanations based on the logic used by the expert who solved the problem.

The above-described characteristics are achieved by employing an approach to case acquisition in which the end-users replay navigation steps employed in the solution of a problem instance (i.e., a sequence of attribute-value pairs). Each such step constitutes a navigation element that specifies:

a test on data retrieved previously (which should evaluate to true in the context of the case being added);

a text description of the insights provided as a result of the test; and a new database query that is posed as a result of these insights.

The text description component of the last navigation element in a case contains the solution used for the problem instance. Note that the problem instance itself is not stored in the case repository, just the sequence of navigation elements used to solve the problem instance.

The invention specifies algorithms for case-based reasoning modules, in particular for case acquisition, case retrieval, and case removal. None of these algorithms requires pre-specifying the attributes to be employed. Thus, this invention enables the development of general-purpose case-based systems and embedded case-based systems. Efficient case retrieval is achieved by structuring the case repository as a directed graph that combines initial sequences of navigation elements common to more than one case.

BRIEF DESCRIPTION OF THE DRAWINGS

FIG. 4 itemizes the application programming interface functions for the case storage graph that this invention relies on;

FIG. 5 describes the information flows for acquiring a new case;

DESCRIPTION OF THE PREFERRED EMBODIMENT

The preferred embodiment is placed in the context of a help desk application in which a help desk staff member (HDSM) responds to complaints made by clients who are end-users of a computer system. A knowledge-based system (KBS) aids in this task by interacting with HDSMs to locate similar problems that have been solved previously. If no such problem is located, the matter is referred to an expert in the area (who may also be an HDSM).

Figure 1:
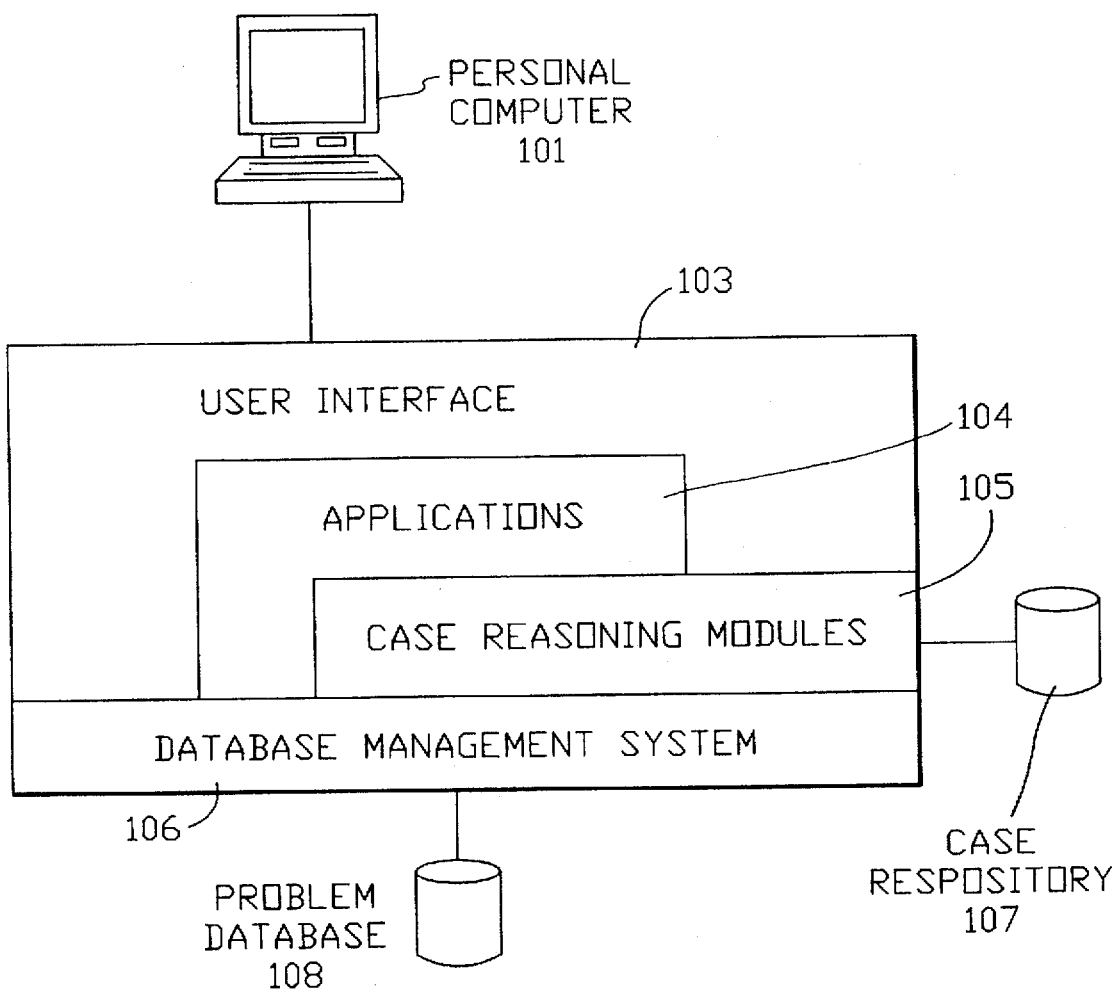
FIG. 1 depicts the computer system architecture for the preferred embodiment of the knowledge-based systems (KBS)

FIG. 1 depicts the components of a computer system for the KBS in the preferred embodiment. HDSMs interact with the KBS through a terminal or Personal Computer 101. The KBS has a user interface 103 that handles HDSM interactions and routes them appropriately: to a database management system 106 that provides access to a problem database 108; to the case-based reasoning (CBR) modules 105 in the invention that store previously obtained solutions (and their associated solution steps) in a case repository 107 (such as a database) of data records; or to related applications 104, which may themselves access problem data or make use of the CBR modules.

Figure 2:
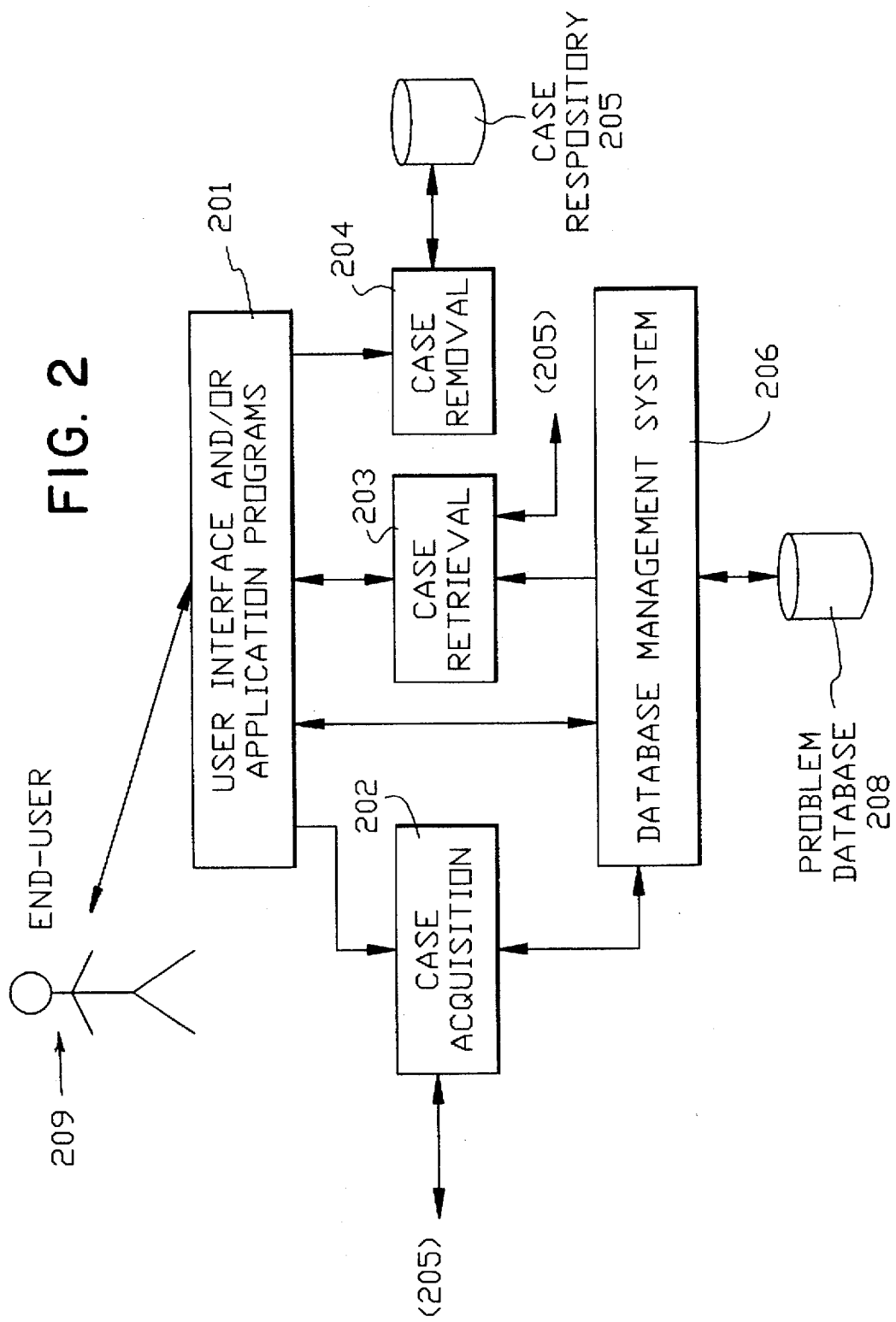
FIG. 2 details the information flows in the preferred embodiment.

FIG. 2 displays the information flows in the preferred embodiment. For convenience, the user interface and application program Blocks 103 and 104 in FIG. 1 are combined into a single Block 201. The three CBR modules, 105 in FIG. 1, are indicated separately in FIG. 2: case acquisition 202, case retrieval 202; and case removal 204. These modules are invoked either by an end-user 209 via the user interface 201 or by application programs 201, and they read and write to the case repository 205. In addition, both the case acquisition and case retrieval modules access the problem database 208 via the database management system 206. The case acquisition module 202 both reads from and writes to the problem database 208 this data whereas the case retrieval module 203 only reads from the problem database 208.

Figure 3:
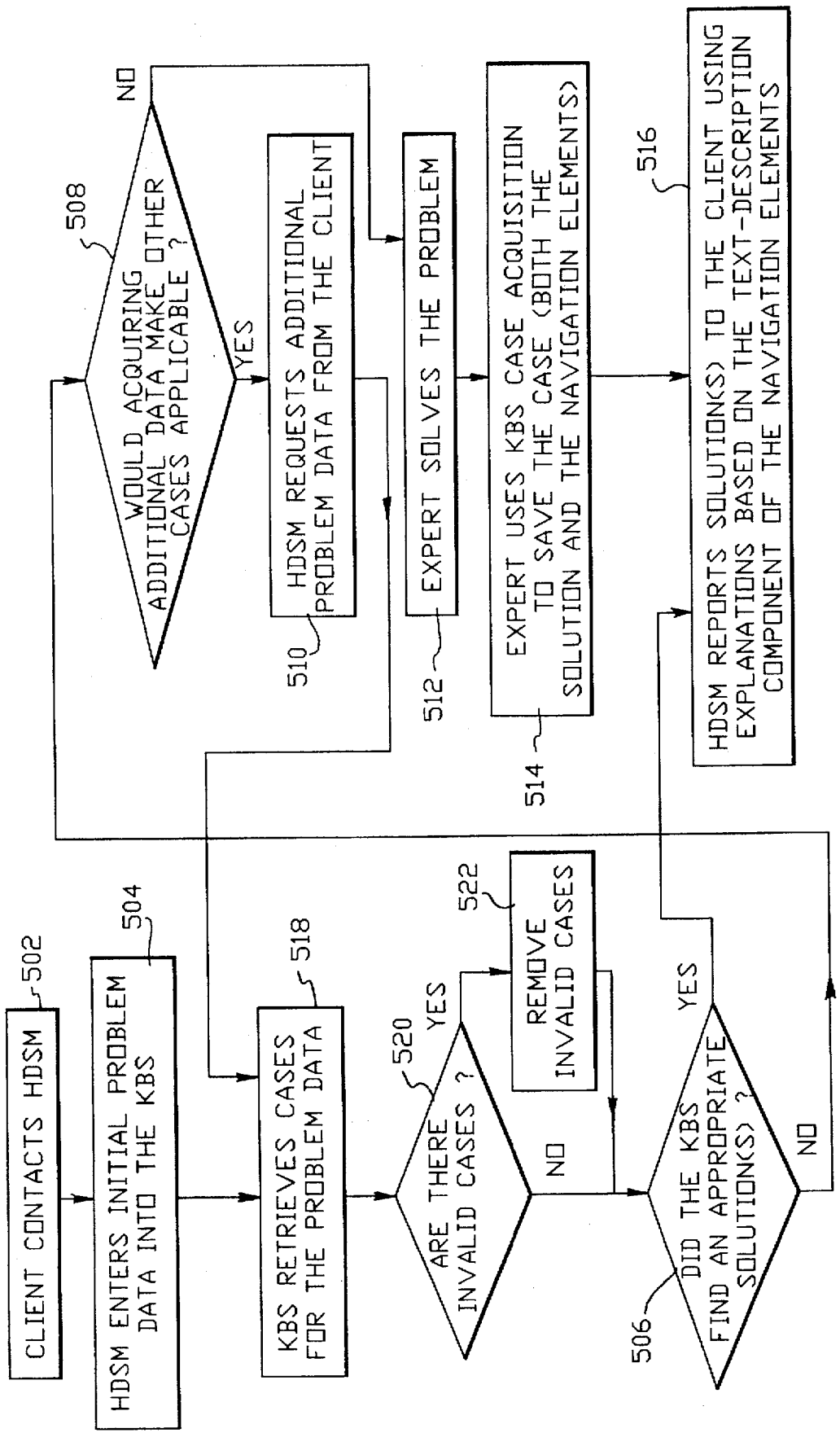
FIG. 3 depicts the sequence of activities performed when solving a client's complaint.

FIG. 3 depicts the activities involved with solving a client's problem. In 502, a client with a problem contacts the HDSM. In 504, the HDSM solicits from the client initial data that describes the problem encountered. In 518, the HDSM invokes the KBS with this initial data to retrieve relevant cases as well as cases whose relevance cannot be determined without additional data; to accomplish this, the KBS makes use of the case retrieval module 203 in FIG. 2. In 520, either the HDSM or the client may determine that some of the retrieved cases are invalid (e.g., due to changes in configuration or business policies), which leads to, in 522, the HDSM invoking the case removal module, 204 in FIG. 2, for the invalid cases via the case removal module. In 506, the HDSM reviews the cases retrieved to determine if an appropriate solution to the client's complaint has been found. If so, in 516 this is reported to the client (with explanations based on information obtained during a previous case acquisition). If no appropriate solution is found, in 508 the HDSM looks at the list of cases that might be applicable if more data are acquired. If one or more of these suspended cases looks promising, in 510 the HDSM requests the necessary data from the client (which may involve running additional data collection software or monitoring programs). Once these data are available, problem determination resumes at Block 518 where the KBS retrieves additional cases based on the newly provided data. If no suspended case exists, in 512 the problem is forwarded to an expert. After the solution has been obtained 514, the expert uses the KBS case acquisition module 202 in FIG. 2 to replay the steps employed (the navigation elements 804 in FIG. 5 stored during case acquisition) and the data examined to solve the problem. Having done this, the solution is reported to the client 516.

The case repository 205 is organized as a directed graph of navigation elements; this is referred to as the case storage graph. FIG. 4 lists the functions on this graph that are made available through a standard programming interface. In 702, children(J) is a function that finds the children of node index J in the case storage graph. In 704, addChild(NE,J) creates a child of node index J for the navigation element NE; this function returns the index of the newly created node. In 706, cases(J) returns a list of the cases associated with node index J. The children and addChild functions are commonly used in graph manipulation tasks performed by existing software (e.g., see A. V. Aho, J. E. Hopcroft and J. D. Ullman "Data Structures and Algorithms", Addison Wesley, 1983). The cases function is easily implemented if a list data structure is associated with each node in the case storage graph to point to the cases associated with that node. Also, those of skill in the art will recognize that these functions are enabled by way of appropriate data structures associated with individual nodes in the case storage graph and data structures associated with the case storage graph as a whole. Details of these algorithms and data structures are not included here.

Figure 6:
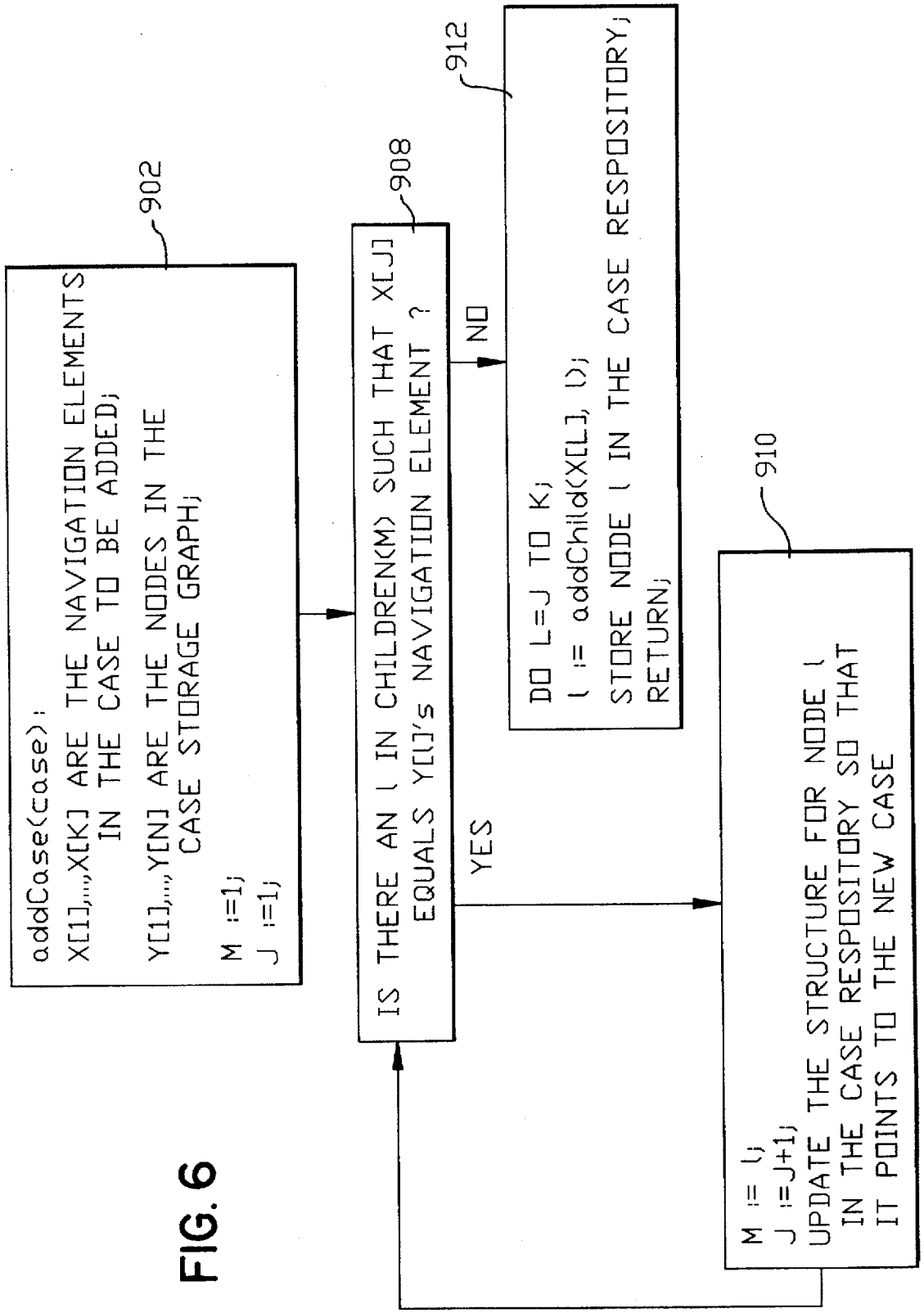
FIG. 6, describes an algorithm for adding cases through appropriate manipulations of the case storage graph.

FIG. 5 gives the high-level information flows for case acquisition 202 in FIG. 2 as employed in 514 in FIG. 3. Recall that in the invention a case is a sequence of navigation elements that are ordered triples consisting of a test, a description, and a query. In 802, the ordered set of navigation elements contained in the variable case is initialized to the empty set. In 804, the expert interacts with the KBS (e.g., via a graphical user interface) to specify navigation elements that the KBS appends to case in 806. In 808, if this is the last navigation element (as indicated, for example, by a "check box"), then in 810 the addCase algorithm of FIG. 6 is invoked to update the case storage graph. Otherwise, another navigation element is specified by the expert in 804.

FIG. 6 describes the addCase algorithm that is invoked by case acquisition in Block 810 of FIG. 5. In way of overview, the algorithm looks for a sequence of nodes in the case storage graph whose associated navigation elements are identical to the ordered list of navigation elements in the case being added. Specifically, at block 902 variables are initialized: $X[1], \ldots, X[K]$ are the navigation elements of the case being added (with $Y[1]$ being the root node); $Y[1], \ldots, Y[N]$ are the nodes in the case storage graph; variable M is the index of the current node in the case storage graph; and variable J is the index of the current navigation element in the case being added. In 908 (using the children function in Block 702 of FIG. 4), the children of the M-th node are examined to see if there is a child with the same navigation element as $X[J]$. If so, a variable I is set to the index of the first such node. In 910 the I-th node is set to the current node in the case storage graph and is updated to point to the case being added; also, J is incremented to index the next navigation element in the case being added. If the test in 908 is negative, then in 912 new nodes are created for the remaining navigation elements in the case being added. Note that addCase causes the case storage graph to be structured as a tree since when the algorithm searches for a matching navigation element it only considers the children of a single node in case storage and hence a child can have at most one parent.

Figure 7:
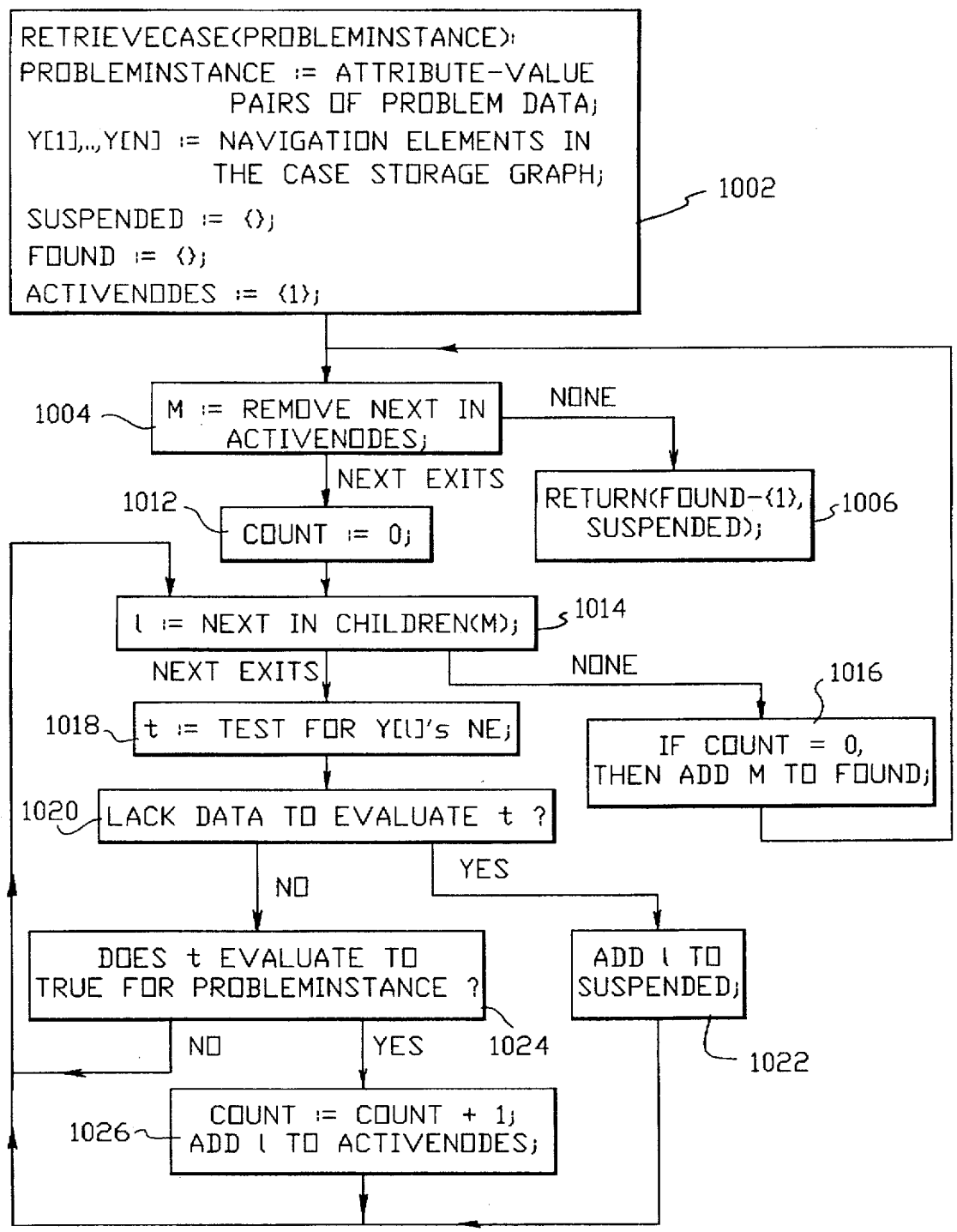
FIG. 7, describes an algorithm for retrieving cases through appropriate manipulations of the case storage graph.

FIG. 7 describes the retrieveCase algorithm that is used in 518 of FIG. 3 and is part of the case retrieval module in 203 of FIG. 2. The algorithm finds those cases that constitute the deepest possible traversal of the case storage data for the problem data provided, and it identifies any suspended cases that might be applicable if additional problem data are obtained (see 508 and 510 in FIG. 3). In 1002, the algorithm's inputs and initializations are described: problemInstance contains the attribute-value pairs in the problem data; $Y[1], \ldots, Y[M]$ are the nodes in the case storage graph; suspended (which is initialized to the empty set) is a list of nodes in the case storage graph from which further navigation may be possible if additional data are obtained; found (which is initialized to the empty set) is a list of nodes in the case storage graph that constitute the deepest possible traversal for the problem data (i.e., either these nodes are leaves or they have no child whose test component evaluates to true for the problem data); and activeNodes is the list of indices of nodes in the case storage graph that are currently being examined. In 1004, the next element in activeNodes is removed and assigned to the variable M. If no element is present (i.e., activeNodes is empty), then in 1006 processing terminates returning found without the first node in the case storage graph (i.e., the root) and suspended. Otherwise, in 1012, count is initialized to 0, and in 1014 the children of $Y[M]$ are examined in sequence. Once all have been examined, in 1016 M is added to found if no child has a test that evaluates to true, and control resumes at 1004. If the list of children has not been exhausted, the index of the next child is assigned to I. In 1018, the test component of the navigation element associated with $Y[I]$ is assigned to the variable t. In 1020, if t cannot be evaluated due to missing data, I is added to suspended in 1022. Otherwise, in 1024 t is evaluated for the attribute-value pairs in problemInstance. If the result is false, control resumes at block 1014. If the result is true, then in 1026 count is incremented and I is added to activeNodes (since the traversal frontier has moved down one level). Following the execution of Blocks 1022 and 1026, control resumes at 1014 to evaluate the next child of M. Application programs and user interface routines employ the functions in FIG. 4 to find the cases associated with the node indices returned and/or to navigate further within the case storage graph. (Additional graph functions in common use may be employed as well, such as a function that locates the parent of a node.)

To one skilled in the art, it should be apparent that generating explanations for a solution can be accomplished with relative ease in the present invention by using the description component of each navigation element in the case. For example, one approach is to list in sequence the description components of navigation elements, starting with the first one through the last one whose test component evaluates to true.

Figure 8:
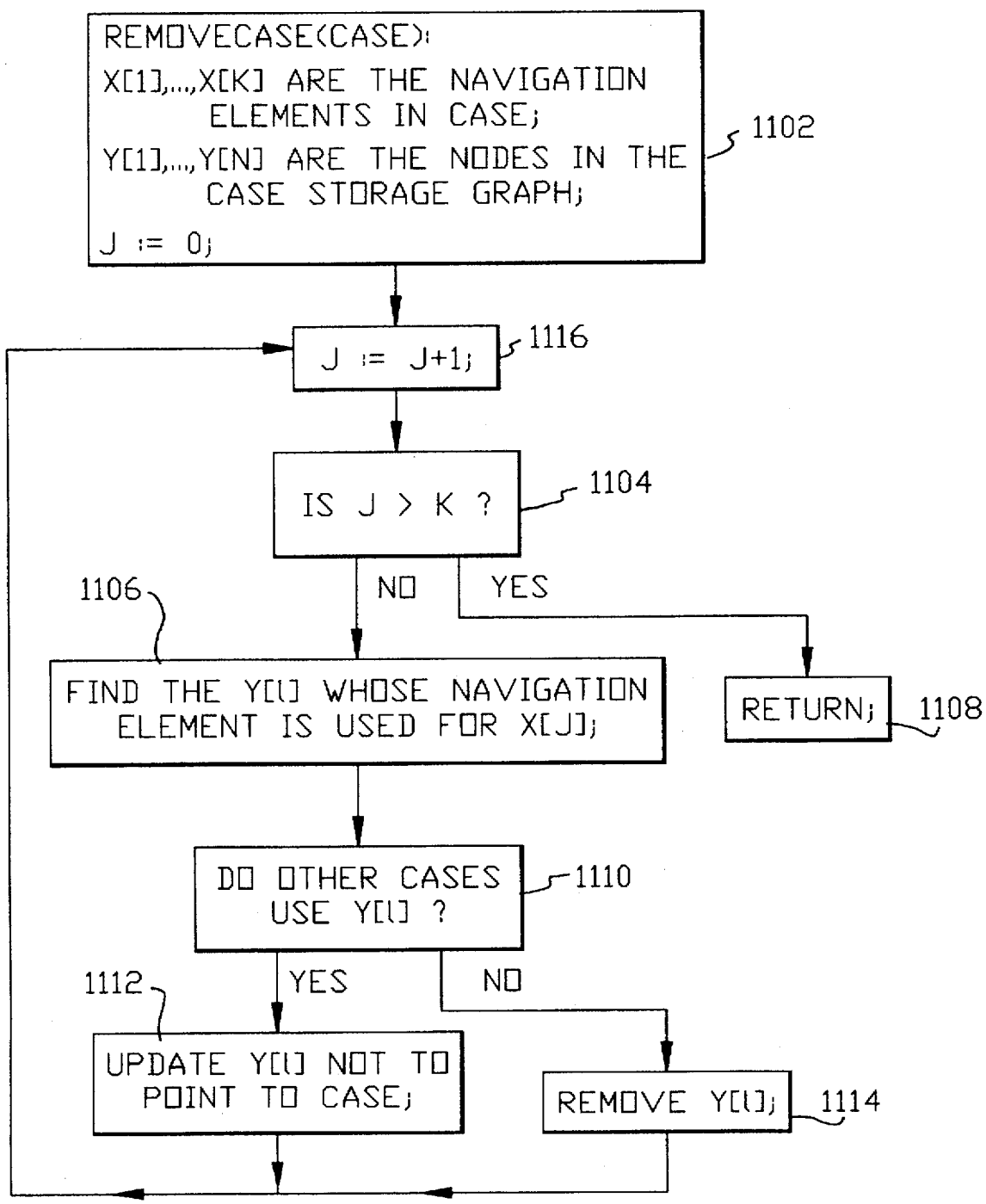
FIG. 8 describes an algorithm for removing cases through appropriate manipulations of the case storage graph.

FIG. 8 describes the removeCase algorithm that is used to remove a case. This algorithm is part of the case removal module, block 204 of FIG. 2, and is employed in Block 522 of FIG. 3. At a high-level, case removal: (a) locates the node in the case storage graph that corresponds to each navigation element in the case to be removed; and (b) updates the data structures for each such node (or removes the node if no other case uses it):

In 1102, inputs are specified and variables are initialized. In particular, J indexes the navigation element in the case being removed. In 1116, J is incremented. In 1104, J is compared to the index of the last navigation element in the case being removed; if all navigation elements in the case have been processed, then in 1108, the algorithm terminates. Otherwise, in 1106 the algorithm locates the $Y[I]$ whose navigation element is used for $X[J]$. If no other case uses $Y[I]$ (as determined in 1110 based on the data structures associated with $Y[I]$), then in 1114 this node is removed. Otherwise, in 1112, $Y[I]$ is updated so that it no longer points to the case being removed. Following the execution of Blocks 1112 and 1114, control resumes at 1116.

An example is presented to illustrate the operation of the addCase and retrieveCase algorithms. Below are listed the attributes that might be examined to solve operating system level performance problems in a computer system.

Date—date that the data were extracted
Shift—prime, swing, midnight
R—response time
CPU—time spent executing or waiting for the CPU
IO—time spent in the input/output subsystem
MEM—time spent waiting for main memory
User 1 aggregate IO
User 1 IO rate for disk 1
. . .
User 1 IO rate for disk K
User 2 IO rate for disk 1
. . .
User N IO rate for disk K
User 1 aggregate CPU consumption
User 1 CPU consumption due to kernel service 1
. . .
User 1 CPU consumption due to kernel service M
User 2 aggregate CPU consumption
User 2 CPU consumption for kernel service 1
. . .
User 2 CPU consumption for kernel service M
User N aggregate CPU consumption
User N CPU consumption for kernel service 1
. . .
User N CPU consumption for kernel service M
User 1 Name
. . .
User N Name
Utilization of Disk 1
. . .
Utilization of Disk K Note that the set of potentially relevant data is large. Thus, it is desirable to use an approach to case-based reasoning that is parsimonious in its data requirements.

Included below are four cases that constitute the initial case repository in the illustrative example. For pedagogical reasons, navigation elements are labeled NEx.y (where x is the case and y is an index within the case).

Case 1
  NE1.1
    t: true
    d: "Get the initial data"
    q: Date, Shift, R, IO, CPU, MEM
  NE1.2
    t: IO>CPU and IO>MEM
    d: "I/O is the bottleneck"
    q: User 1 aggregate IO rate, . . . , User N aggregate IO rate, where User MAX has the largest aggregate IO rate
  NE1.3
    t: User MAX Name="backup" and Shift="prime"
    d: "Performance is degraded because backup is running during prime shift"
Case 2
  NE2.1
    t: true
    d: "Get the initial data"
    q: Date, Shift, R, IO, CPU, MEM
  NE2.2
    t: IO>CPU and IO>MEM
    d: "I/O is the bottleneck"
    q: Disk 1 Utilization, . . . , Disk K Utilization, where Disk MAX has the largest Utilization
  NE2.3
    t: Label of Disk MAX contains the substring 'USER-DAT'
    d: "There is contention for a disk with user data. Examine the accessing programs"
Case 3
  NE3.1
    t: true
    d: "Get the initial data"
    q: Date, Shift, R, IO, CPU, MEM
  NE3.2
    t: Is CPU>IO and CPU>MEM
    d: "CPU is the bottleneck"
    q: User 1 aggregate CPU consumption, . . . , User N CPU consumption, where User MAX has the largest CPU consumption
  NE3.3
    t: User MAX aggregate IO=0
    d: "User MAX may be in an infinite loop"
Case 4
  NE4.1
    t: Date=9/30 and Shift="prime"
    d: "Performance is always poor at the end of the fiscal year"

Each case consists of a sequence of navigation elements. Note that the last navigation element in a case contains the problem solution in its description component, and it does not include a query component.

Figure 9:
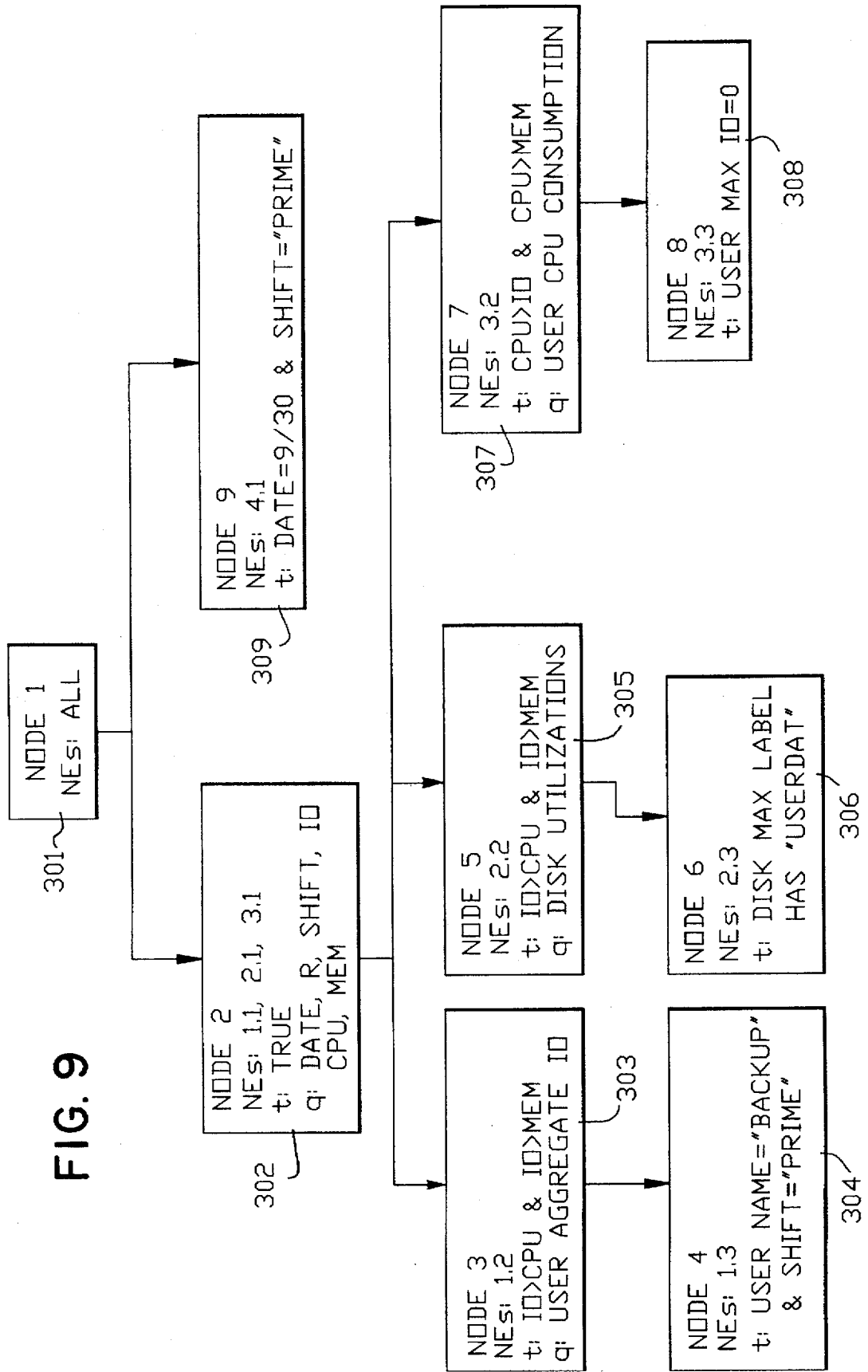
FIGS. 9 and 10 describe case storage graphs used in an example that explains the operation of the aforementioned algorithms.

FIG. 9 depicts the case storage graph that results from applying the addCase algorithm in FIG. 6 to cases 1–4 above. Nodes in the graph are numbered in the order they are created. Blocks 301 through 309 correspond, respectively, to nodes 1 through 9 in the case storage graph. Note that Node 2, 302, is shared by cases 1, 2, and 3 since their first navigation elements are identical (i.e., NE1.1=NE2.1=NE3.1). Also, note that cases 1 and 2 do not have the same node for their second navigation element (since they have different query components) even though the test component of NE1.2 is the same as that for NE2.2.

To illustrate the operation of addCase, consider how case 5 below is added to the case storage graph in FIG. 9.
Case 5
  NE5.1
    t: true
    d: "Get the initial data"
    q: Date, Shift, R, IO, CPU, MEM
  NE5.2
    t: IO>CPU and IO>MEM
    d: "I/O is the bottleneck"
    q: Disk 1 Utilization, . . . , Disk K Utilization, where Disk MAX has the largest Utilization
  NE5.3
    t: Label of Disk MAX contains the substring 'PROGRAM'
    d: "Look for large programs"

In Block 902 of FIG. 6, M (which identifies a node in the case storage graph) and J (the navigation element in case 5) are both initialized to 1. In 908, addCase invokes the function children (with an argument of 1); this returns the set {2,9}. For both indices in this set:
  their navigation element is compared with the J-th navigation element in case 5. (Recall that J is initialized to 1.) For node number 2, they are identical; for node number 9, they are not.

In 910, M is set to I, and J is incremented; thus, M=2 and J=2. The data structure associated with node M is updated to point to case 5.

Now, the second navigation element of case 5 is processed. Since M=2, addCase invokes children(2), which returns the set {3,5,7}. Only node 5 matches NE5.2; so the data structure for this node is updated to point to case 5. Now, M=5 and I=3.

Next the third navigation element of case 5 is processed. children(5) returns the set {6}. NE5.3 does not match the navigation element associated with node 6. Thus, the addChild function is invoked to create a new node in the case storage graph that points to case 5.

Figure 10:
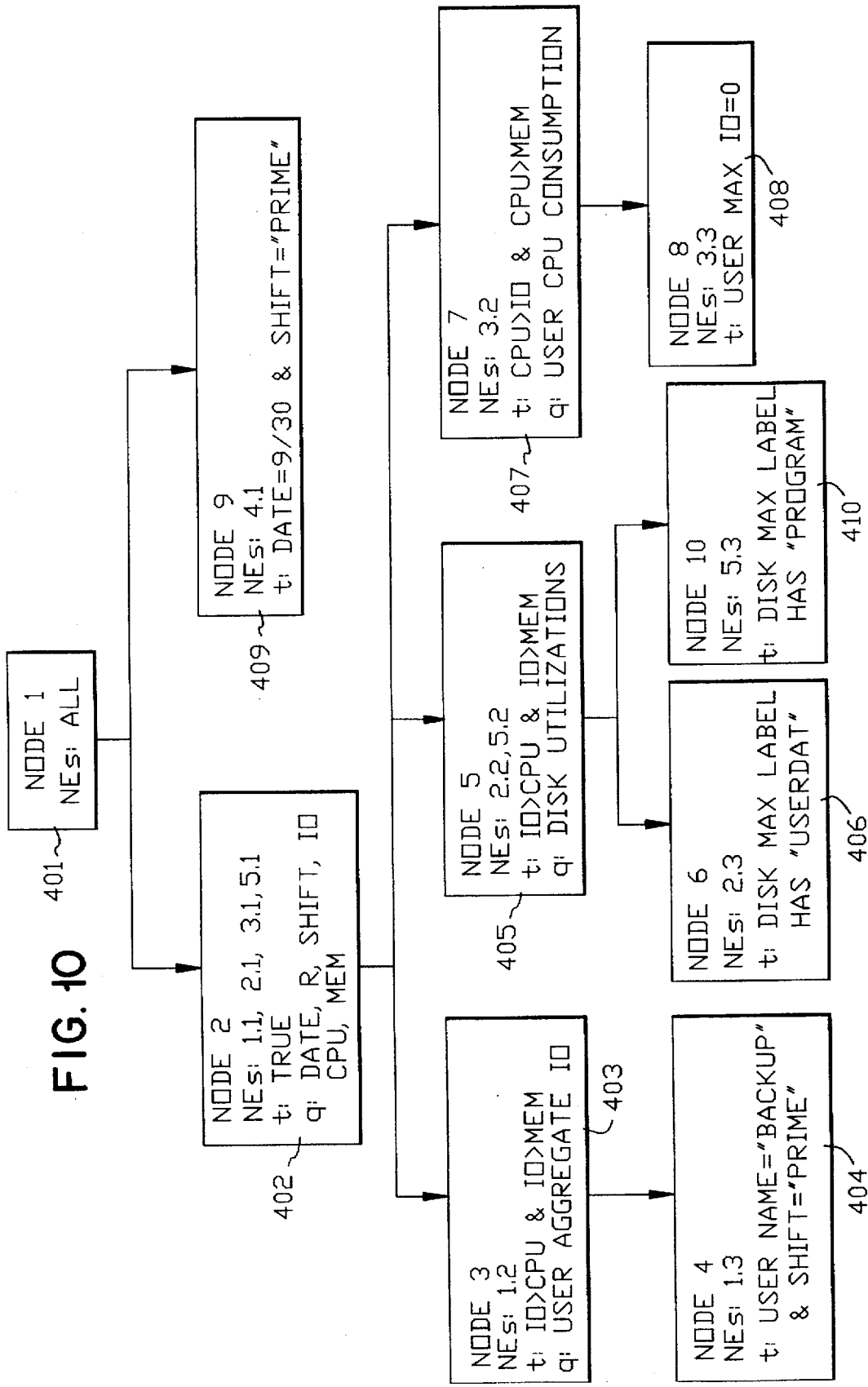

The resulting case storage graph is depicted in FIG. 10. Blocks 401–410 correspond respectively to nodes 1 through 10 in the case storage graph. Note that this graph is identical to the one in FIG. 9, with the exception of Blocks 402, 405, and 410. Block 402 corresponds to Block 302, but has been updated to point to NE5.1. Similarly, Block 405 corresponds to Block 305, but has been updated to point to NE5.2. Block 410 is a new node in the case storage graph that corresponds to NE5.3.

The operation of retrieveCase FIG. 7 is illustrated using the case storage graph depicted in FIG. 10 for the attribute-value pairs of problem data, 1002 in FIG. 7, listed below:

Date: 9/30

Shift: prime

R: 8

CPU: 5

IO: 2

MEM: 1

User 1 aggregate CPU consumption: 50

User 2 aggregate CPU consumption: 30

User 3 aggregate CPU consumption: 20

User 1 aggregate IO rate: 300

User 2 aggregate IO rate: 150

User 3 aggregate IO rate: 200

In Block 1002 of FIG. 7, activeNodes is initialized to {1}. The outer loop of retrieveCase begins at Block 1004. In the first pass of the outer loop, the following occurs:

In 1014, the children of node 1 (the only element in activeNodes) are obtained: nodes 2 and 9.

In 1020, a check is made to see if the necessary data are available; this is true for both nodes 2 and 9.

In 1024, the tests for both nodes 2 and 9 evaluate to true.

When 1004 is entered for the second time, activeNodes is {2,9}. Since node 9 is a leaf, found is set to {9} in 1016. Node 2, 402 in FIG. 10, has the children 3, 5, and 7 (Blocks 403, 405, and 407). Only the test for the navigation element associated with node 7 evaluates to true.

When 1004 is entered for the third time, activeNodes is {7} and therefore, the children of node 7, 407, are considered. There is only one child, node 8, 408. Since the test for the navigation element associated with node 8 does not evaluate to true, count remains 0. Hence, node 7 is added to found in 1016. When 1004 is entered for the fourth time, activeNodes={}. Thus, in Block 1006, retrieveCase returns {7,9} in found and {} in suspended.

The invention has been described in the context of a single computer system that help desk personnel interact with to solve performance problems. This description should not, however, be interpreted as limiting the invention to such an environment. For example, the invention applies equally well to heterogeneous, distributed computing systems and to any application involving information retrieval or exploratory tasks (e.g., ad hoc database queries). Indeed, one potential application of the invention is to train intelligent agents to locate, retrieve, and filter information of interest in environments such as the Internet. Further generalizations should be readily apparent as well, such as extending the query component of a navigation element to be the invocation of a program (e.g., to take an action to solve a problem instance).

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

Having thus described our invention, what I claim as new and desire to secure by Letters Patent is:

1. A method of data navigation employing a knowledge system that uses case-based reasoning to compare a new problem instance with a case repository of past problem instances structured as an ordered set of navigation elements, said method comprising:

communicating problem data for the new problem instance into the knowledge system;

retrieving from the case repository a past problem instance relevant to the problem data; wherein a navigation element associated with the past problem instance comprises an ordered triple including: a test expressing data navigation conditions; a text description explaining the navigation element; and a query; and generating information about the new problem instance based on the navigation element.

2. The method of claim 1 wherein the case repository comprises a directed graph structure wherein navigation elements common to past problem instances are combined.

3. The method of claim 1, wherein the query represents a database query indexing a next member in the ordered set of navigation elements, said method further comprising:

retrieving the next member in the ordered set of navigation elements.

4. The method of claim 1, further comprising:

collecting additional problem data which would make an additional past problem instance relevant to the new problem instance; and iterating said retrieving step and said collecting step until the new problem instance is resolved or all past problem instances relevant to the new problem instance have been retrieved.

5. The method of claim 4, further comprising:

identifying an invalid past problem instance; and removing from the case repository the invalid past problem instance.

6. The method of claim 4 wherein said all past problem instances relevant to the new problem instance have been retrieved and none contain the solution to the new problem instance, further comprising:

specifying a navigation element for input to the knowledge system;

appending, responsive to said specifying step, the navigation element to an ordered set of navigation elements for the new problem instance;

repeating said specifying step and said appending step until the new problem instance is resolved; and updating, responsive to said repeating step, the case repository with the ordered set of navigation elements for the new problem instance.

7. The method of claim 6 wherein the case repository is a data structure having a plurality of nodes referencing navigation elements and wherein said updating step further comprises:

searching the case repository for a sequence of nodes referencing navigation elements which correspond to a sequence of the ordered set of navigation elements;

revising, responsive to said searching step, the case repository to incorporate the new problem instance;

incorporating a new node referencing navigation elements for an ordered navigation element not found in said searching step; and repeating said searching, revising, and incorporating steps until the new problem instance is added to the case repository.

8. A method of generating a case repository of problem instances for use in a knowledge system for data navigation wherein said problem instances are structured as an ordered set of navigation elements stored in the case repository, comprising:

specifying a navigation element corresponding to a new problem instance for input to the knowledge system, wherein the navigation element comprises an ordered triple including: a test expressing data navigation conditions: a text description explaining the navigation element; and a query;

appending, responsive to said specifying step, the navigation element to the set of ordered navigation elements;

repeating said specifying and appending steps until the problem instance is resolved; and updating the case repository with the ordered set of navigation elements corresponding to the new problem instance.

9. The method of claim 8 wherein the case repository is a data structure having a plurality of nodes referencing navigation elements and wherein said updating step further comprises:

searching the case repository for a sequence of nodes referencing navigation elements which correspond to a sequence of navigation elements for the new problem instance;

revising a sequence of nodes found in said searching step to incorporate the new problem instance;

incorporating a new node referencing navigation elements for an ordered navigation element not found in said searching step; and repeating said searching, updating, and incorporating steps until the new problem instance is added to the case repository.

10. A case-based knowledge system for data navigation having a processor adapted to compare a new problem instance with past problem instances, said system comprising:

a case repository for storing the past problem instances wherein the past problem instances are structured as an ordered set of navigation elements;

a case retrieval function for retrieving from the case repository, a past problem instance relevant to the new problem instance wherein a navigation element associated with the past problem instance is an ordered triple including: a test expressing data navigation conditions; a text description explaining the navigation element; and a query; and a user interface for routing the new problem instance to, and a retrieved past problem instance from, the case retrieval function.

11. The system of claim 10 wherein the user interface routes the new problem instance to and from related applications.

12. The system of claim 10 wherein the the query represents a database query for retrieving a next member in the ordered set of navigation elements, said system further comprising:

means for generating a database query indexing a next member in the ordered set of navigation elements.

13. The system of claim 10, further comprising:

said case retrieval function including logic for iteratively retrieving from the case repository, all past problem instances relevant to the new problem instance and all past problem instances whose relevance is dependent upon receiving additional new problem instance data, until the new problem instance is resolved or said all past problem instances relevant to the new problem instance have been retrieved.

14. The system of claim 13, further comprising:

means for identifying an invalid past problem instance, a case removal function for removing the invalid past problem instance from the case repository.

15. The system of claim 10 wherein the case repository comprises a directed graph structure wherein navigation elements common to past problem instances are combined.

16. The system of claim 15 wherein said all past problem instances relevant to the new problem instance have been retrieved and none contain the solution to the new problem instance, further comprising:

a case acquisition function for creating an ordered set of navigation elements for the new problem instance and updating the case repository with the ordered set of navigation elements created;

wherein the user interface is adapted to route the navigation elements for the new problem instance to the case acquisition function.

17. The system of claim 16 wherein the case repository is a data structure having a plurality of nodes referencing navigation elements and wherein said case acquisition function further comprises:

means for iteratively searching and revising the case repository to incorporate a sequence of the navigation elements for the new problem instance common to past problem instances;

wherein the ordered set of navigation elements for the new problem instance are added to the case repository.

18. A case-based knowledge system for data navigation having a processor adapted to compare a new problem instance with past problem instances, said system comprising:

a case repository for storing the past problem instances as an ordered set of navigation elements;

a case acquisition function for iteratively creating the ordered set of navigation elements corresponding to the new problem instance and updating the case repository with the ordered set of navigation elements created;

wherein a navigation element associated with the new problem instance is an ordered triple including: a test expressing data navigation conditions; a text description explaining the navigation element; and a query, and a user interface adapted to route the navigation elements for the new problem instance to the case acquisition function.

19. The system of claim 18 wherein the case repository comprises a directed graph structure wherein navigation elements common to past problem instances are combined.

20. The system of claim 13 wherein the next member is a last navigation element which includes: a text description having a solution for the new problem instance; and a null query.

21. The system of claim 10, further comprising:

means for invoking a program, coupled to the case retrieval function, to take an action based on the query to solve the new problem instance.

22. The system of claim 10, wherein the case repository of past problem instances is a database of information and the problem data includes an ad hoc database query; and said case retrieval function includes logic for querying the database and retrieving information relevant to the database query.

23. The method of claim 3, wherein the next member is a last navigation element which includes: a text description having a solution for the new problem instance; and a null query.

24. The method of claim 1, further comprising:

invoking a program to take an action based on the query to solve the new problem instance.

25. The method of claim 1, wherein the case repository of past problem instances is a database of information, said method further comprising:

said communicating problem data includes communicating an ad hoc database query; and said retrieving step includes querying the database and retrieving information relevant to the database query.

26. A program storage device readable by a machine, tangibly embodying a program of instructions executable by the machine to perform method steps for data navigation wherein a knowledge system uses case-based reasoning to compare a new instance with a case repository of past instances, said method steps comprising:

communicating data for the new instance into the knowledge system;

retrieving from the case repository a past instance relevant to the data; wherein the past instance is an ordered set of navigation elements and wherein a navigation element associated with the past instance comprises an ordered triple including: a test expressing data navigation conditions; a text description explaining the navigation element; and a query; and generating information about the new instance based on the navigation element.

27. The program storage device of claim 26, wherein the query represents a database query indexing a next member in the ordered set of navigation elements, said method comprising the step of:

retrieving the next member in the ordered set of navigation elements.

28. The program storage device of claim 26, said method further comprising the steps of:

collecting additional data which would make an additional past instance relevant to the new instance; and iterating said retrieving step and said collecting step until the new instance is resolved or all past instances relevant to the new instance have been retrieved.

29. The program storage device of claim 27 wherein the next member is a last navigation element which includes a null query.

30. The program storage device of claim 26, further comprising the steps of:

invoking a program to take an action relevant to the new instance, based on the query.

31. The program storage device of claim 26, wherein the case repository is a database, said method further comprising the steps of:

said step of communicating data includes the step of communicating an ad hoc database query; and said retrieving step includes the step of retrieving information relevant to the database query.

32. A program storage device readable by a machine, tangibly embodying a program of instructions executable by the machine to perform method steps of generating a case repository of instances for use in a knowledge system using case-based reasoning wherein the instances are structured as an ordered set of navigation elements stored in the case repository, comprising the method steps of:

specifying one or more navigation elements corresponding to a new instance for input to the knowledge system, wherein a navigation element comprises an ordered triple including: a test expressing data navigation conditions; a text description explaining the navigation element; and a query;

appending, responsive to said specifying step, the navigation element to the set of ordered navigation elements; and updating the case repository with the one or more navigation elements corresponding to the new instance.

* * * * *